United States Patent [19]

Itani et al.

[11] Patent Number: 5,443,873
[45] Date of Patent: Aug. 22, 1995

[54] SILICONE RUBBER ROLLER FOR ELECTROPHOTOGRAPHY AND METHOD OF PRODUCING THE SAME

[75] Inventors: Hitoshi Itani; Yuji Yamasaki; Hirotoshi Murakami, all of Hyogo, Japan

[73] Assignee: Sumitomo Rubber Industries, Ltd., Kobe, Japan

[21] Appl. No.: 974,059

[22] Filed: Nov. 12, 1992

[30] Foreign Application Priority Data

Nov. 12, 1991 [JP] Japan .................................. 3-295399
May 14, 1992 [JP] Japan .................................. 4-122231

[51] Int. Cl.6 ............................................... B32B 1/08
[52] U.S. Cl. .................................. 428/36.5; 428/36.8; 428/36.9; 428/323; 428/447; 492/56; 492/59; 355/219; 430/48; 524/588
[58] Field of Search ............... 428/323, 331, 447, 448, 428/450, 36.5, 36.8, 36.9; 528/34, 501, 901; 430/48, 99; 355/279, 285, 219, 271, 274, 275; 492/56, 59, 53; 524/588, 847, 492, 495; 252/511

[56] References Cited

U.S. PATENT DOCUMENTS

| | | | |
|---|---|---|---|
| 3,848,305 | 11/1974 | Jachimiak | 29/132 |
| 4,188,423 | 2/1980 | Swift | 427/444 |
| 4,360,566 | 11/1982 | Shimizu et al. | 428/404 |
| 4,534,889 | 8/1985 | van Konynenburg et al. | 252/511 |
| 4,764,841 | 8/1988 | Brewington et al. | 361/226 |
| 4,807,341 | 2/1989 | Nielsen et al. | 29/132 |
| 4,827,868 | 5/1989 | Tarumi et al. | 118/653 |
| 4,956,211 | 9/1990 | Saito | 428/36.5 |
| 4,971,844 | 11/1990 | Schoustra et al. | 428/34.1 |
| 5,140,371 | 8/1992 | Ishihara et al. | 355/219 |
| 5,164,443 | 11/1992 | Watanabe | 524/495 |
| 5,177,552 | 1/1993 | Isogai et al. | 355/285 |
| 5,179,148 | 1/1993 | Inoue et al. | 524/265 |
| 5,209,872 | 5/1993 | Takahashi et al. | 252/511 |
| 5,270,768 | 12/1993 | Murata | 355/219 |

OTHER PUBLICATIONS

Patent Abstracts of Japan, vol. 10, No. 190 (P-474), Jul. 4, 1986 & JP-A-61 036 777 (Ricoh) Feb. 21, 1986.

*Primary Examiner*—Patrick J. Ryan
*Assistant Examiner*—Marie R. Macholl
*Attorney, Agent, or Firm*—Nikaido, Marmelstein, Murray & Oram

[57] ABSTRACT

There is disclosed an electrically conductive rubber roller for electrophotography which changes very little in electric resistance with changes in environment. This roller is used for charging and image transferring processes in copying machines and laser beam printers. The roller comprises a porous body of crosslinked silicone composition, containing at least a silica type filler, carbon black, a foaming agent and siloxane polymer; the composition has an electric resistance of $10^3$–$10^8$.

9 Claims, 6 Drawing Sheets

SILICONE RUBBER ROLLER FOR ELECTROPHOTOGRAPHY AND METHOD OF PRODUCING THE SAME

BACKGROUND OF THE INVENTION

The present invention relates to an electrically conductive rubber roller utilized as a charging means for copying machines, laser beam printers and the like.

In electrophotographic recording widely used in copying machines, laser printers and the like, recording is effected through a series of such processes, such as charging, exposure, development, image transfer, discharging and cleaning, as shown in FIG. 3. In addition, FIG. 4 shows an example of an electrophotographic recording device. The numeral 1 denotes an original table glass; 2 denotes a copy lamp; 3 denotes a selfoc lens; 4 denotes a photoreceptor; 5 denotes a charging roller; 6 denotes an image transfer roller; 7 denotes a developing roller; 8 denotes a paper feed roller; 9 denotes a pad; 10 and 11 denote resist rollers; 12 denotes a developing cartridge; 13 denotes a toner seal; 14 denotes a cleaning blade; and 15 denotes a waste toner box.

As for the charging process, wide use has heretofore been made of a corona charging method in which a wire called a corona charger is subjected to a high voltage. This corona charging method has the following problems: As corona charging proceeds, the photoreceptor and other parts are deteriorated by active molecules such as ozone. These active molecules are also said to be harmful to the human body. Further, this method requires a high voltage source of thousands of volts, causing potential danger due to high voltage. Further, the maintenance aspect is fraught with the problems of wire contamination and wire breakage.

Thus, recently, instead of the corona charging method, which is fraught with problems as described above, practical use has been made of a contact charging method using an electrically conductive rubber roller. In this contact charging method using an electrically conductive rubber roller, the electrically conductive rubber roller which is externally impressed with voltage is contacted with the photoreceptor surface, whereby an electric charge is directly injected into the photoreceptor surface to charge the latter to a predetermined potential.

The above-mentioned contact charging method is also applied to the image transfer process. That is, a toner image formed on the photoreceptor surface is transferred onto the transfer paper sheet surface to which a voltage of a few kilovolts is applied by the electrically conductive rubber roller which is a transfer means contacted with the backside of the transfer paper sheet surface, so as to form an electrostatic charge on the transfer paper sheet surface, whereby the toner image formed on the photoreceptor surface is transferred to the transfer paper sheet surface.

References (1) Japanese Patent Application Disclosure No. 302777/1970.

(2) "Charging and transfer process", page 47, from the Electrophotography Society's 30th Training Course Text "From Fundamentals of Elements of Electrophotographic Technology to Recent Trends".

(3) "Contact Type Charging Technique Not Using Corona Charger", page 573, from Electrophotography Society's journal, vol. 27, No. 4 (1988).

In said contact charging method, use has heretofore been made of a sponge roller in the form of EPDM (ethylene propylene rubber) used as an electrically conductive rubber roller whose resistance has been adjusted to $10^7$–$10^{10}$ Ω by applying carbon black thereto, which is a common means for imparting electric conductivity.

However, in the case of said electrically conductive rubber roller, the resistance greatly changes to $5 \times 10^7$–$10 \times 10^7$ Ω in high temperature high humidity (32° C. and 85% relative humidity) environments and to $10^9$ Ω in low temperature low humidity (15° C. and 10% relative humidity) environments (See Japanese Patent Application Disclosure No. 302777/1970. It is believed that the reason is that, in high humidity environments, electrically conductive elastomer usually tends to absorb water to lower its electric resistance. With said electrically conductive rubber roller, therefore, changes in electric resistance due to the environment are so large that the charge potential becomes unstable under the influence of environmental changes, thereby failing to provide good image quality.

Actually, when printing was effected by a laser beam printer (Laser Shot Printer A-404, produced by Canon Inc.) by using said electrically conductive EPDM rubber roller, the following result was obtained which was believed to be due to changes in the electric resistance of the electrically conductive rubber roller.

(1) Faults in image quality appeared in the solid portion in high temperature high humidity and low temperature low humidity environments. (2) When dry paper is printed, faults in image quality appeared in the solid portion.

SUMMARY OF THE INVENTION

Accordingly, the present invention has been accomplished with the above in mind and it is an object of the invention to provide an electrically conductive rubber roller for electrophotography which produces small changes in electric resistance when subjected to environmental changes.

To achieve said object, the present invention provides a silicone rubber for electrophotography made mainly of a porous body in the form of a crosslinked silicone rubber composition.

Said silicone rubber composition comprises

| component: | Siloxane polymer | 100 parts by weight |
|---|---|---|
| | Silica type filler | 18–28 parts by weight |
| | Carbon black | 5–12 parts by weight |
| | Foaming agent, additive, vulcanizing agent, etc. | 10–30 parts by weight. |

The resistance of the electrically conductive rubber roller for electrophotography according to the present invention was measured in different environments and the result shown in Table 1 below was obtained.

TABLE 1

| | |
|---|---|
| High temp. high humidity (35.0° C. × 85% relative humidity) | $1.3 \times 10^6$ Ω (with 1500 V) |
| Ordinary temp. ordinary humidity (23.5° C. × 55% relative humidity) | $0.9 \times 10^6$ Ω (with 1500 V) |
| Low temp. low humidity | $1.4 \times 10^6$ Ω (with 1500 V) |

TABLE 1-continued (10.0° C. × 15% relative humidity)

It is seen from Table 1 that the silicone rubber roller for electrophotography made according to the present invention has small changes in electric resistance as a function of environmental (temperature and relative humidity) changes.

FIG. 1 shows the relation between impressed voltage and current which flows through the silicone rubber roller for electrophotography according to the invention under high temperature high humidity (32.5° C. and 90% relative humidity), ordinary temperature ordinary humidity (23.5° C. and 55% relative humidity) and low temperature low humidity (10.0° C. and 15% relative humidity) environments. It is seen that changes in impressed voltage and current characteristics due to environmental changes are very small.

The present invention, using a porous body in the form of a crosslinked silicone rubber composition, has obtained a silicone rubber roller for electrophotography which produces small changes in electric resistance as a function of environmental changes.

DESCRIPTION OF PREFERRED EMBODIMENTS

Figure 1:
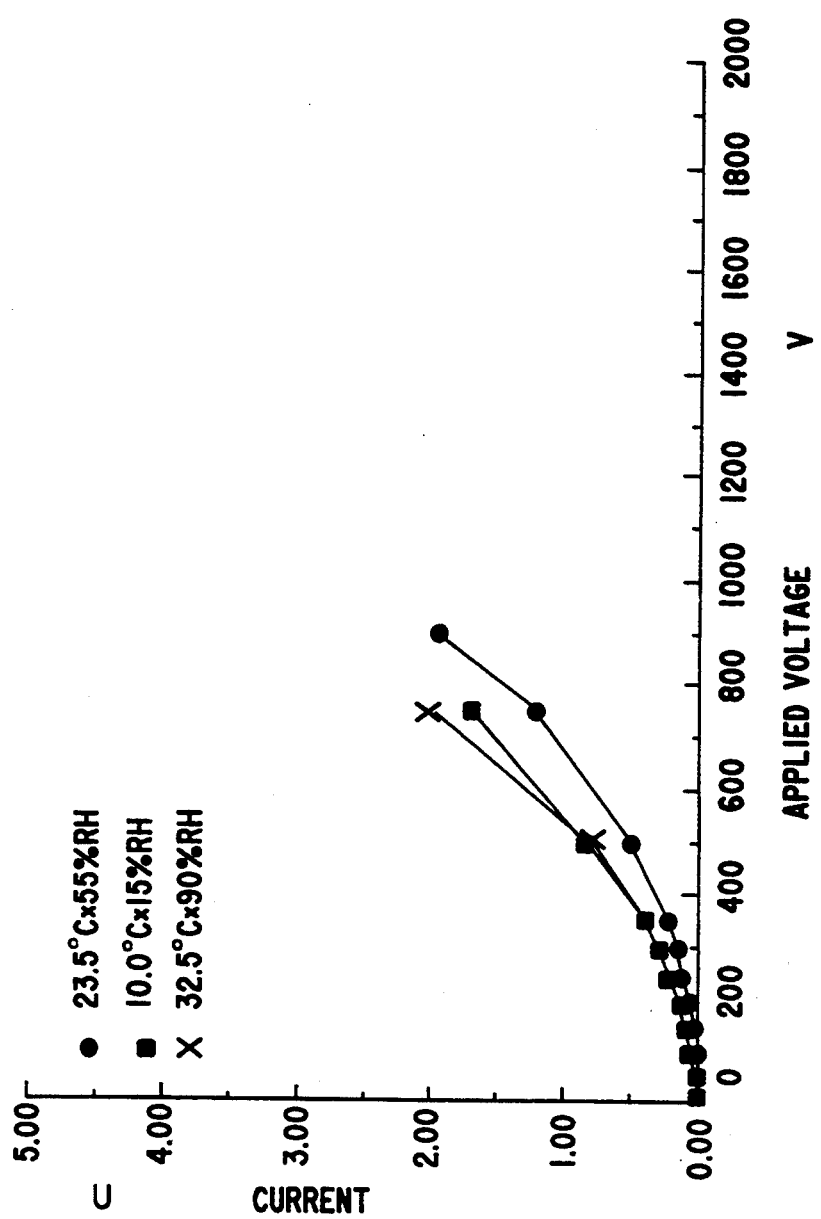
FIG. 1 is a graph showing the relation between impressed voltage and current in an electrically conductive rubber roller for electrophotography according to the present invention in high temperature, high humidity, ordinary temperature, ordinary humidity, low temperature and low humidity environments.
Figure 2A:
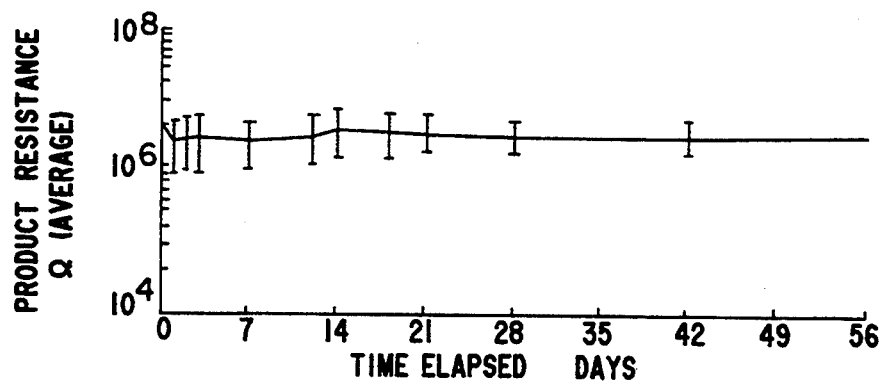
FIG. 2 is a graph showing time-dependent changes in the electric resistance, hardness, width and outer diameter of the electrically conductive rubber roller for electrophotography according to the present invention.
Figure 2B:
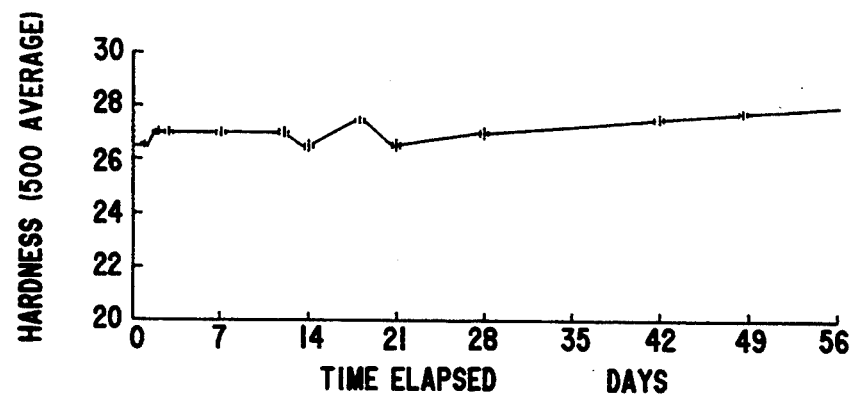
Figure 2C:
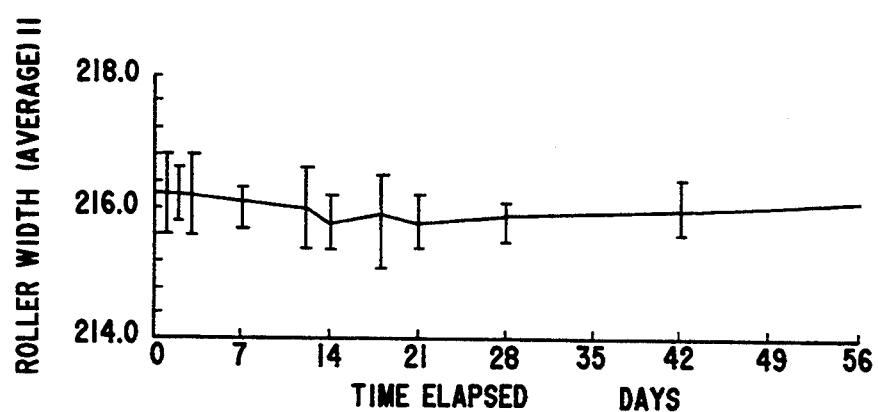
Figure 2D:
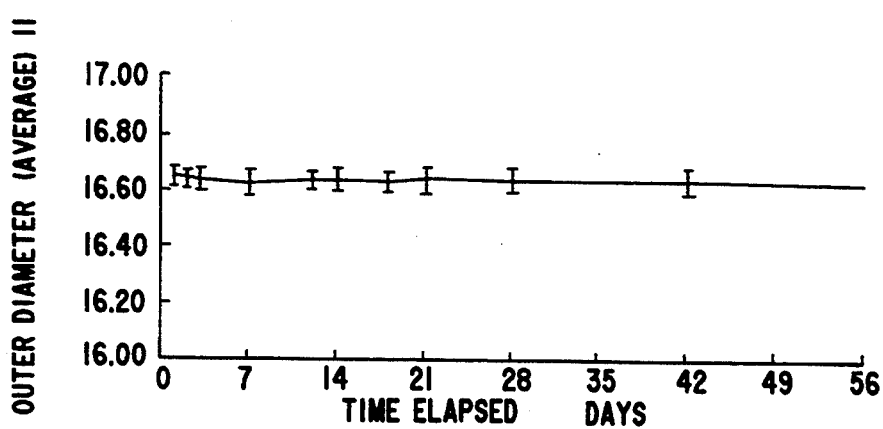
Figure 3:
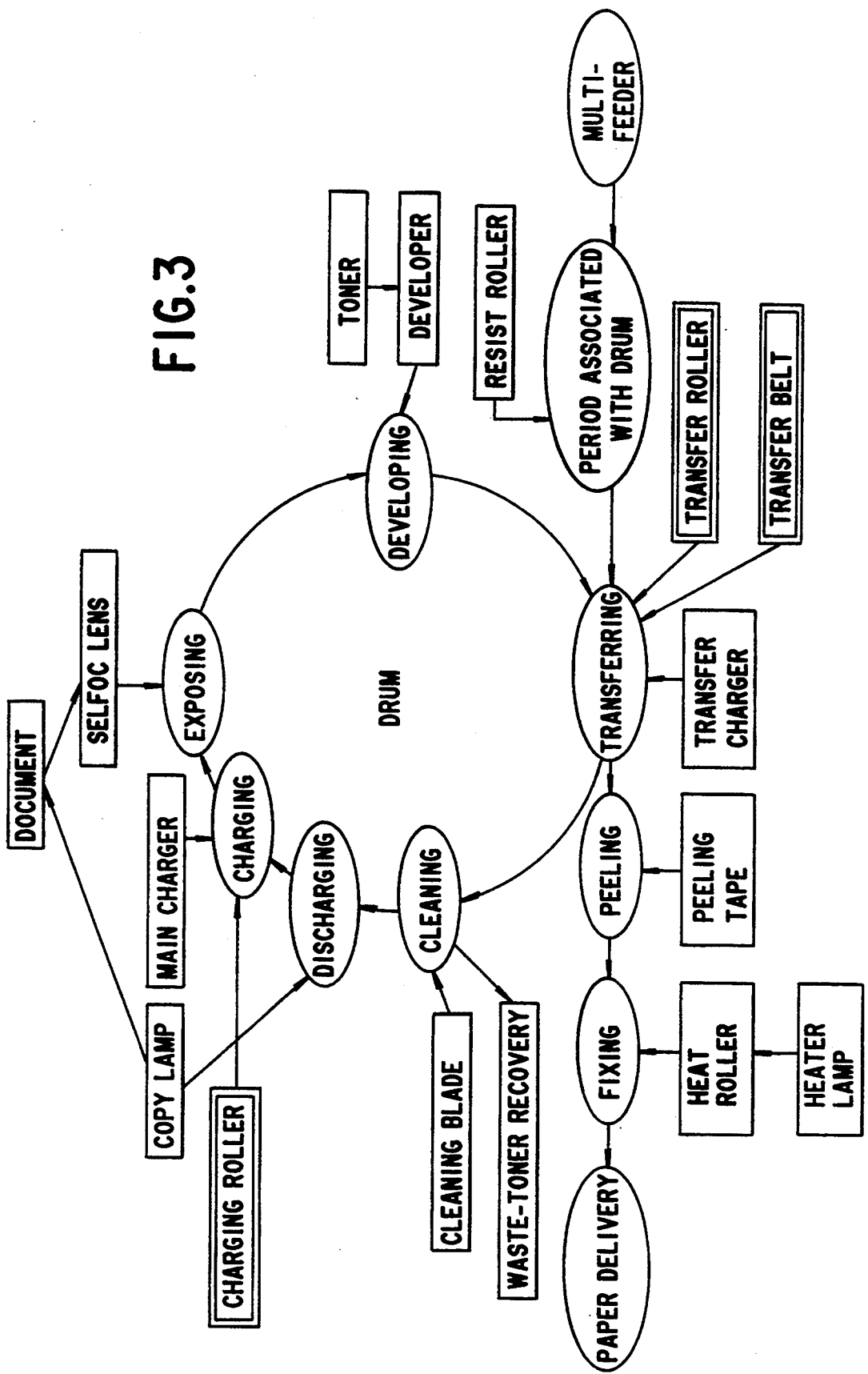
FIG. 3 is a process diagram for electrophotography.
Figure 4:
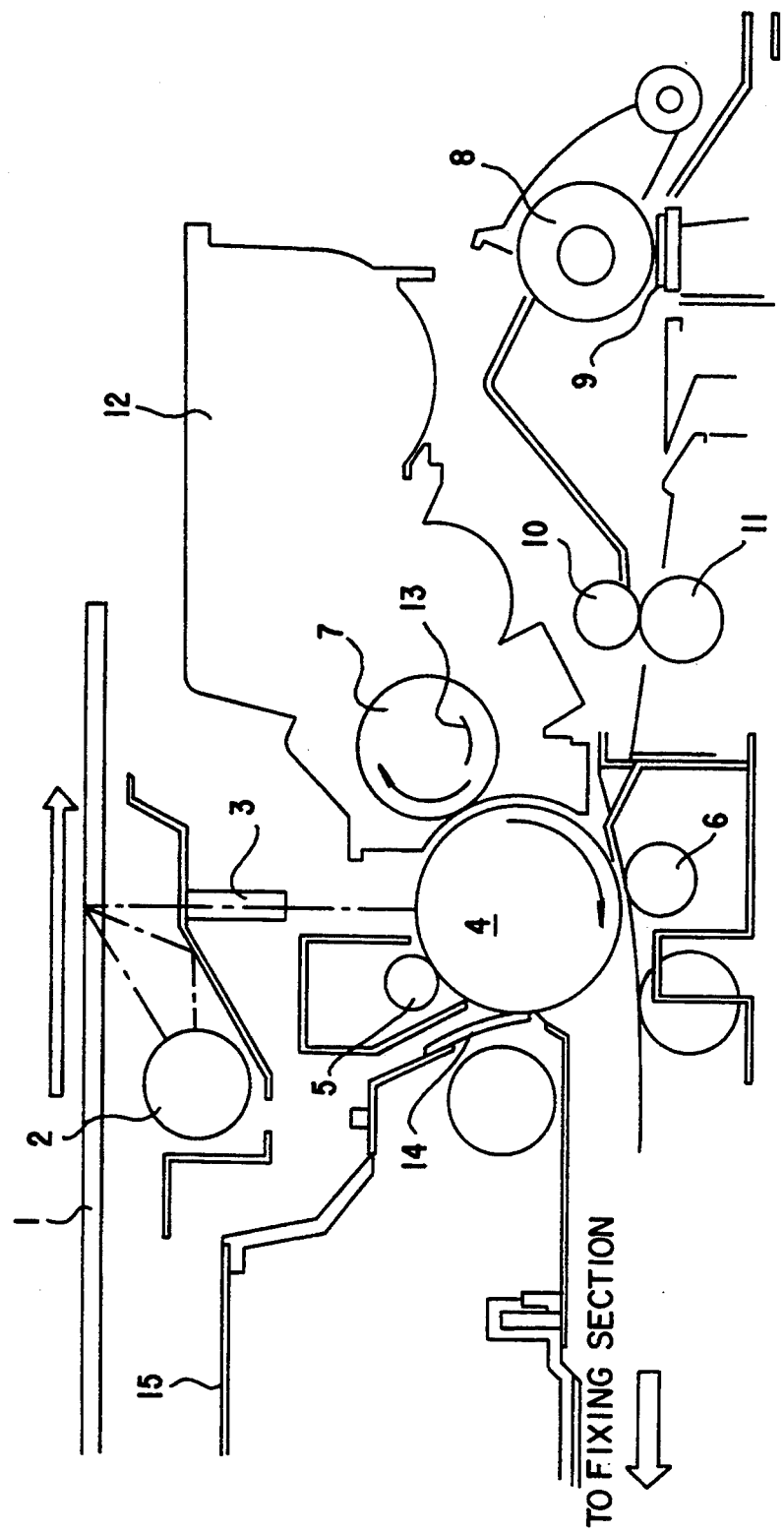
FIG. 4 is an example of electrophotographic recording.

An embodiment of the invention will now be described.

An electrically conductive rubber roller for electrophotography made according to the invention is formed by adding a silica type filler, carbon black, a foaming agent, additive, a vulcanizing agent and the like to a rubbery siloxane polymer, subjecting it to transfer forming, injection molding, press forming, extrusion molding, and the like, whereby it is crosslinked and made into roller form.

As the siloxane polymer used for the crosslinked silicone rubber composition of the first form of the present invention, it is suitable to use phenyl type siloxane, dimethyl type siloxane or the like. However, the use of siloxane polymer alone fails to provide rolls of sufficient durability necessary for an electrically conductive rubber roller for electrophotography. For this reason, a silica type filler is added. As such silica type fillers, use is made of hydrated silica, anhydrous silica and salts thereof. If the additive amount is selected so that it is 18-28 parts by weight per 100 parts by weight of siloxane polymer, a composition results having a low hardness of not more than 35° (Asker C). If the hardness exceeds 35°, the pressure of contact with the photoreceptor increases, print failure takes place, decreasing the contact area, so that the images are not stabilized (stabilized image transfer cannot be attained).

Further, the first form of the present invention adds carbon black in order to impart electric conductivity. Preferable carbon blacks include furnace blacks, such as FEF and GPF, acetylene black, and ketjen black. If the additive amount of carbon black is selected so that it is 5-12 parts by weight per 100 parts by weight of siloxane polymer, a composition having an electric resistance of $10^3$–$10^8$ Ω is obtained.

Table 2 below shows the results of experiments on printing made by the rollers in Experiments 1-5 in varied environments using a laser beam printer (LB-A404 produced by Canon Inc.)

TABLE 2

|  | Experiment 1 Silicone sponge | Experiment 2 Silicone sponge | Experiment 3 Silicone sponge | Experiment 4 Silicone sponge | Experiment 5 Silicone sponge |
| --- | --- | --- | --- | --- | --- |
| Electric resistance Ω | $5 \times 10^2$ | $5 \times 10^3$ | $5 \times 10^5$ | $5 \times 10^8$ | $5 \times 10^9$ |
| Hardness | Asker C 25° | Asker C 26° | Asker C 25° | Asker C 27° | Asker C 28° |
| Image evaluation |  |  |  |  |  |
| High temp. high humidity | X | Δ | ◯ | Δ | X |
| Ordinary temp. ordinary humidity | Δ | ◯ | ◯ | ◯ | X |
| Low temp. low humidity | ◯ | ◯ | ◯ | ◯ | ◯ |

Criteria of evaluation
◯: Characters and charts are distinct, with no unevenness in solid portion.
Δ: Characters and charts are distinct, with little unevenness in solid portion and with blurs.
X: Characters and charts are distinct, with much unevenness in solid portion and with blurs.
High temp. high humidity (32.5° C. and 90% relative humidity)
Ordinary temp. ordinary humidity (23.5° C. and 55% relative humidity)
Low temp. low humidity (10.0° C. and 15% relative humidity)

The above results show that faults in image quality, such as poor settlement and unevenness in the solid portion occur: in the case of the roller in Experiment 1, in high temperature high humidity environments and in the case of the roller in Experiment 5, in high temperature high humidity and ordinary temperature ordinary humidity environments but that in the case of the rollers in Experiments 2 through 4, changes in electric resistance are small, so that satisfactory image quality is obtained in any of the environments.

FIG. 2 shows time-dependent changes in the electric resistance, hardness, width and outer diameter of the roller made according to Embodiment 3; it is seen that stable electric resistance and hardness can be obtained despite time-dependent changes.

As has been described so far, according to -the first form of the present invention, since a porous body in the form of a crosslinked silicone rubber composition is used, changes in electric resistance due to environments are so small that the satisfactory image quality is obtained without being influenced by environmental changes. Further, since the electric resistance is stabilized despite environmental changes, there is a merit that impressed voltage can be easily controlled.

The first form of the present invention has been described above, and the second form of the invention will now be described.

Rubber rollers used in the contact charging method are required to have environmental change-resisting stability, ozone resistance and heat-resisting stability, and as such roller which meets these requirements, there is a silicone rubber roller which is chemically and physically stable as described above.

A roller made of silicone rubber provides superior image quality in the stage immediately after the beginning of use, but long-term use results in the tracks of the roller appearing in images printed out, a phenomenon, so-called touch memory, gradually deteriorating the image quality.

It is believed that this problem is caused by cyclic siloxanes of relatively low polymerization degree expressed by the formula:

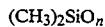

(where n is 3–30 or so) or dimethyl silicone oil, methylphenyl silicone oil, methylhydrogen silicone oil or other non-functional silicone oils bleeding for transfer to the photoreceptor.

That is, the low polymerization degree siloxanes and non-functional silicone oils moved to the photoreceptor denature the insulating photoconductors forming the photoreceptor and deteriorate their functions. Moreover, since these substances are superior in water repelling and insulating properties, their presence itself obstructs the functions of the photoreceptor. And if the silicone rubber roller is held in contact with the photoreceptor for a relatively long time (for example, during downtime of the apparatus), these substances locally contaminate the photoreceptor, causing the roller tracks (touch memory) to appear in the image. Further, as the silicone rubber roller is used for a long time, the whole of the photoreceptor is contaminated by these substances, with the result that the image quality gradually deteriorates.

The bleeding of low polymerization degree siloxanes and non-functional silicone oils is known in the art and some of the commercially available silicone rubber type compounds (using silicone raw rubber as a base polymer, with a reinforcing filler and the like added thereto) are of the grade in which these substances are removed to some extent by forcibly absorbing them. In the case of ordinary uses such as touch panels, this grade solves the problem of bleeding, but in the case of a roller for electrophotography, the removal provided by such commercially available grade is not sufficient, causing contamination of the photoreceptor due to trace amounts of low polymerization degree siloxanes and non-functional silicone oils.

It is known that low polymerization degree siloxanes can be removed to some extent by heating during crosslinking. For example, in the case of millable silicone rubber material, the secondary crosslinking effected by heating for about 2 to 5 hours removes low polymerization degree siloxanes. However, its effect is still insufficient, and of the low polymerization degree siloxanes, those having relatively high polymerization degrees and non-functional silicone oils can hardly be removed by heating to the extent of said secondary crosslinking. That is, with heating at ordinary pressure, contamination of the photoreceptor cannot be prevented.

Although low polymerization degree siloxanes and non-functional silicone oils can be removed by extraction treatment using a solvent, its effect is very low. If it is desired to achieve sufficient degree of removal by this treatment alone, a very long period of time is required, making it unsuitable for practical use from the standpoint of productivity.

The second form of the present invention has been accomplished with the above in mind and an object of the invention is to provide a silicone rubber roller for electrophotography wherein trace amounts of low polymerization degree siloxanes and non-functional silicone oils have been substantially completely removed and there is no possibility of contamination of the photoreceptor not only immediately after the beginning of use but also for a long period of time thereafter, and a method of producing the same.

To solve said problems, we have studied various treating methods and found that when silicone rubber is heated in vacuum, low polymerization degree siloxanes having considerably high polymerization degrees and non-functional silicone oils can be efficiently sucked for removal, though the reason is not clear. Our further study has led to the finding that when a silicone rubber type compound of the grade in which low polymerization degree siloxanes and non-functional oils have been removed to some extent is molded and then vacuum-heated, the low polymerization degree siloxanes and non-functional silicone oils are substantially completely removed so that a silicone rubber roller for electrophotography having no danger of contaminating the photoreceptor not only immediately after the beginning of use but also for a long time thereafter. Thus we have accomplished the second form of the present invention.

That is, the second form of the present invention provides a silicone rubber roller for electrophotography, wherein a molding material containing a rubber compound having silicone raw rubber used as a base polymer, in which the sum of the concentrations of the low polymerization degree siloxanes and non-functional silicone oils contained in said rubber compound is not more than 5000 ppm, is crosslinked and molded in a roller form, said molding material being vacuum-heated subsequent to molding.

Further, the present invention provides a method of producing a silicone rubber roller for electrophotography, wherein a molding material containing a rubber compound having silicone raw rubber used as a base polymer, in which the sum of the concentrations of the low polymerization degree siloxanes and non-functional silicone oils contained in said rubber compound is not more than 5000 ppm, is crosslinked and molded in a roller form and then vacuum-heated.

The molding material used for the second form of the present invention may be liquid or millable, but a millable molding material which can be kneaded in the same process as used for conventional rubber material is particularly suitable for use. A millable molding material is prepared by adding various additives including crosslinking agent, catalyst, non-reinforcing (bulking) filler and resistance control agent to a commercially available silicone rubber compound having added thereto an anhydrated silica type reinforcing filler such as aerosol, with gel-like silicone raw rubber (linear organopolysiloxane polymer) having a polymerization degree of 5000 to 10000 or so used as the base, and melt-kneading the mixture as by a roll mill. Further, the silicone rubber roller for electrophotography according to the present invention is preferably in the form of soft sponge for the reason of an increased area of contact with the photoreceptor to stabilize the charging property. To this end, a foaming agent which foams by the heat developed during primary or secondary crosslinking may be added to the molding material. The amounts of these additives may be substantially the same as before.

As for the silicone raw rubber which is the base polymer, use may be made of various known types, such as dimethyl silicone type, methylvinyl silicone type, methylphenylvinyl silicone type and ferrosilicone type.

The sum of the concentrations of the low polymerization degree siloxanes and non-functional silicone oils contained in the silicone type rubber compound is restrained to not more than 5000 ppm. If the sum of the concentrations of the two types of substances exceeds 5000 ppm, the two types of substances cannot be completely removed by vacuum heating alone after molding, and although this does not cause the problem of contamination of the photoreceptor immediately after the beginning of use of the roller, the low polymerization degree siloxanes and non-functional silicone oils remaining in the roller gradually bleed to the surface to contaminate the photoreceptor; thus, the removal effect is lost.

To adjust the sum of the concentrations of said two types of components contained in the silicone rubber compounds to not more than 5000 ppm, mention may be made of a method in which the raw silicone rubber is vacuum-treated and the two types of components are forcibly sucked for removal. However, in some of the commercially available silicone rubber type compounds, the sum of the concentrations of the two types of components has been adjusted within said range; therefore, it is desirable to use them as such from the standpoint of productivity and cost. As for commercially available silicone rubber type compounds in which the sum of the concentrations of the two types of components has been adjusted within said range, mention may be made of Product No. X-30-1807U (electrically conductive silicone compound) and Product No. X-30-1807M (insulating silicone compound) produced by The Shin-Etus Chemical Co., Ltd.

As for crosslinking agents, for example, organic peroxide type crosslinking agents may be used. As for such organic peroxide type crosslinking agents, mention may be made of benzoyl peroxide, bis-2, 4-dichlorobenzoyl peroxide, dicumyl peroxide, 2, 5-dimethyl-2, 5-bis-(tert-butyl peroxide) hexane, and tert-butylcumyl peroxide. Further, aliphatic azo compounds and sulfur can also be used as crosslinking agents.

As for bulking fillers, mention may be made of inorganic fillers, such as reinforcing fillers, calcium carbonate, hard clay, barium sulfate, talc, mica, asbestos, and graphite, and organic fillers, such as regenerated rubber, powder rubber, asphalts, styrene resin, and glue.

To produce a silicone rubber roller for electrophotography from a molding material containing said components, the production method of the present invention is employed in which the molding material is crosslinked and molded in roller form and then vacuum-heated.

To crosslink and mold the molding material in roller form, the same method as in the prior art is employed. For example, in the case of a millable molding material, it is primarily crosslinked concurrently with molding using such molding method as compression molding, injection molding or transfer molding or it is molded in roller form as by calender roll molding, extrusion molding and primarily crosslinked as a known crosslinking method, such as HAV (hot air vulcanization) and then it is secondarily crosslinked using a hot air drier or the like. Further, the vacuum heating to be described below may be substituted for secondary crosslinking.

To vacuum-heat the molded roller, a vacuum oven or the like is used.

Although the conditions for vacuum heating are not particularly restricted, preferable conditions include an ultimate vacuum of 5 mm Hg or less, a heating temperature (furnace wall temperature) of 150°–250° C., and a treating time of 3–25 hours. In the case where the ultimate vacuum exceeds 5 mm Hg to a great extent or heating temperature is far below 150° C. or the treating time is much shorter than 3 hours, it would be impossible to thoroughly remove low polymerization degree siloxanes and non-functional silicone oils. If the heating temperature is far above 250° C. or the treating time is longer than 25 hours, not only waste of energy but also denaturing or deterioration of the roller would occur.

This vacuum heating substantially completely removes the low polymerization degree siloxanes and non-functional silicone oils, completing a silicone rubber roller for electrophotography having no danger of contaminating the photoreceptor.

In addition, in the second form of the present invention, at the stage before or after said vacuum heating, the molded roller may be subjected to solvent extraction treatment. If solvent extraction treatment is effected, non-functional silicones of relatively high molecular weight and low polymerization degree siloxanes can be reliably removed and the residual concentrations of these substances can be further decreased.

As for solvents, use may be made of various solvents which can dissolve low polymerization degree siloxanes and non-functional silicones, preferably solvents being acetone, hexane, ethyl acetate and toluene.

The silicone rubber roller for electrophotography of the present invention produced by the above-described production method of the present invention has almost no traces of the low polymerization degree siloxanes and non-functional silicone oils as they are substantially completely removed by the vacuum heating treatment. Thus, even if it is, placed in contact with the photoreceptor surface, there is no danger of contaminating the photoreceptor not only at the beginning of use but also for a long period of time thereafter. Therefore, the silicone rubber roller for electrophotography according to the present invention can be employed in image forming apparatuses such as electrostatic copying machines and laser beam printers and used therein as a contact charging roller disposed in contact with the photoreceptor surface, such as a charging roller for uniformly charging the surface of the photoreceptor, a transfer roller for transferring toner images formed on the surface of the photoreceptor to a printing material such as paper, and a discharging roller for removing the residual charge on the photoreceptor surface.

In the case where the silicone rubber roller for electrophotography of the present invention is used as said contact charging roller, the resistance of its surface is preferably $10^3$–$10^{10}$ Ω. If the surface resistance is less than $10^3$ Ω and the roller is used as a charging roller, it sometimes happens that the charge once applied to the photoreceptor is absorbed by the roller, making it impossible to impart a predetermined charge to the photoreceptor. If the surface resistance exceeds $10^{10}$ Ω, the voltage for charging the photoreceptor to a predetermined level increases, requiring a higher voltage source and hence increasing the size of the apparatus.

To adjust the resistance of the surface of the silicone rubber roller for electrophotography within said range, this can be attained by using an electrically conductive silicone rubber type compound and an insulating silicone rubber type compound, suitably adjusting the mixing proportions thereof and adjusting the amount of addition of an resistance adjusting agent used as an additive.

The silicone rubber roller for electrophotography of the present invention, as described above, is preferably in sponge form in order to increase the area of contact with the photoreceptor so as to stabilize the charging property.

In addition, the silicone rubber roller for electrophotography of the present invention, besides being used as a charging roller, can be used as a paper feed roller or conveyor roller which does not contact the photoreceptor surface but whose components tend to move to the photoreceptor to contaminate the latter.

Embodiments of the second form of the invention will now be described with reference to comparison examples.

Embodiment 1

60 parts by weight of an electrically conductive silicone rubber type compound (Product No. X-30-1807U produced by The Shin-Etus Chemical Co., Ltd.) in which the sum of the concentrations of low polymerization degree siloxanes and non-functional silicone oils had been adjusted to not more than 5000 ppm and 40 parts by weight of an insulating silicone compound (Product No. X-30-1807M produced by The Shin-Etus Chemical Co., Ltd.) in which the sum of the concentrations of the two types of components had been likewise adjusted to not more than 5000 ppm, were mixed with the following additives and melted and kneaded by a roll mill, thereby preparing a millable molding material.

| | Additive | Added amount |
|---|---|---|
| Forming agent | Product No. X-30-1847U produced by The Shin-Etus Chemical Co., Ltd. | 5 phr |
| Crosslinking agent | Product No. X-30-1848U produced by The Shin-Etus Chemical Co., Ltd. | 2.5 phr |
| | Product No. X-30-1849U produced by The Shin-Etus Chemical Co., Ltd. | 2.0 phr |
| Catalyst | Product No. PL-2 produced by The Shin-Etus Chemical Co., Ltd. | 0.03 phr |
| Catalytic control agent | Product No. X-30-253 produced by The Shin-Etus Chemical Co., Ltd. | 0.03 phr |

Then, said molding material was extrusion-molded in roller form and primarily crosslinked by HAV method at 200° C. for 30 minutes, thereby molding a roller.

Said roller was secondarily crosslinked and vacuum heated using a vacuum oven (Model DP61, a vacuum constant temperature dryer, produced by Yamato Science Co., Ltd.) at an ultimate vacuum of 2 mm Hg, a furnace wall temperature of 240° C. for 6 hours, thereby producing a silicone rubber roller for electrophotography.

Embodiments 2–6

Rollers made of the same molding material as in Embodiment 1 and primarily crosslinked and molded under the same conditions as in Embodiment 1 were secondarily crosslinked using an ordinary pressure constant temperature dryer (Model DNF64 produced by Yamato Science Co., Ltd.) by HAV method at 200° C. for 4 hours and then vacuum-heated using the same vacuum oven as described above under the conditions shown in Table 1, thereby producing silicone rubber rollers for electrophotography.

TABLE 1

| | Vacuum heaving conditions | | |
|---|---|---|---|
| | Vacuum (mm Hg) | Temperature (°C.) | Time (hr) |
| Embodiment 2 | 2 | 240 | 24 |
| Embodiment 3 | 2 | 240 | 6 |
| Embodiment 4 | 2 | 240 | 4 |
| Embodiment 5 | 2 | 200 | 6 |
| Embodiment 6 | 2 | 200 | 4 |

[0031]

COMPARISON EXAMPLE 1

60 parts by weight of an electrically conductive silicone rubber type compound (Product No. X-30-289U produced by The Shin-Etus Chemical Co., Ltd.) in which the sum of the concentrations of low polymerization degree siloxanes and non-functional silicone oils had not been adjusted to not more than 5000 ppm and 40 parts by weight of an insulating silicone compound (Product No. KE-1551U produced by The Shin-Etus Chemical Co., Ltd.) in which the sum of the concentrations of the two types of components had not been adjusted to not more than 5000 ppm, were mixed with the following additives and melted and kneaded by a roll mill, thereby preparing a millable molding material.

| | Additive | Added amount |
|---|---|---|
| Forming agent | Product No. KEP-13 produced by The Shin-Etus Chemical Co., Ltd. | 5 phr |

-continued

| Additive | | Added amount |
|---|---|---|
| Crosslinking agent | Product No. C-3M produced by The Shin-Etus Chemical Co., Ltd. | 2.5 phr |
| | Product No. HC-101 produced by The Shin-Etus Chemical Co., Ltd. | 2.0 phr |
| Catalyst | Product No. PL-2 produced by The Shin-Etus Chemical Co., Ltd. | 0.03 phr |
| Catalytic control agent | Product No. X-30-253 produced by The Shin-Etus Chemical Co., Ltd. | 0.03 phr |

Said molding material was primarily crosslinked and molded under the same molding conditions as in Example 1 to provide a roller, which was then secondarily crosslinked using an ordinary pressure constant temperature dryer (Model DNF64 produced by Yamato Science Co., Ltd.) by HAV method at 200° C. for 4 hours, thereby producing a silicone rubber roller for electrophotography.

COMPARISON EXAMPLE 2

A silicone rubber roller for electrophotography was produced in the same manner as in Embodiment 1 except that the same molding material as in Comparison Example 1 was used.

COMPARISON EXAMPLE 3

A silicone rubber roller for electrophotography was produced in the same manner as in Comparison Example 1 except that the same molding material as in Embodiment 1 was used.

COMPARISON EXAMPLE 4

A silicone rubber roller for electrophotography was produced in the same manner as in Comparison Example 3 except that the secondary crosslinking was effected at 250° C. for 4 hours.

COMPARISON EXAMPLE 5

A roller made of the same molding material as in Embodiment 1 and primarily crosslinked and molded under the same conditions as in Embodiment 1 was washed with trichloroethane heated to 80° C. for 10 minutes, thereby producing a silicone rubber roller for electrophotography was produced in the same manner as in Comparison Example 3 except that the secondary crosslinking was effected at 250° C. for 4 hours.

COMPARISON EXAMPLES 6–10

Rollers made of the same molding material as in Embodiment 1 and primarily crosslinked and molded under the same conditions as in Embodiment 1 were immersed in solvents shown in Table 2 for 76 hours for extraction treatment, thereby producing silicone rubber rollers for electrophotography

TABLE 2

| | Solvent |
|---|---|
| Comparison Example 6 | Acetone |
| Comparison Example 7 | Hexane |
| Comparison Example 8 | Ethyl acetate |
| Comparison Example 9 | Toluene |
| Comparison Example 10 | Ethanol |

Each of the silicone rubber rollers for electrophotography in said embodiments and comparison examples was pressed against the photoreceptor of a laser beam printer (Laser Shot Printer A404 produced by Canon Inc,) and was left for 72 hours at an environmental temperature of 23.5° C. and an environmental humidity of 55% RH and then 5 solid test charts were continuously printed to examine the presence or absence of touch memory on the formed images, The photoreceptor contamination was evaluated on the basis of the following evaluation criteria, O: No touch memory
Δ: Slight touch memory
X: Touch memory clearly seen The results are shown in Table 3.

TABLE 3

| | Test chart | | | | |
|---|---|---|---|---|---|
| | 1st | 2nd | 3rd | 4th | 5th |
| Embodiment 1 | Δ | O | O | O | O |
| Embodiment 2 | Δ | Δ | O | O | O |
| Embodiment 3 | O | O | O | O | O |
| Embodiment 4 | O | O | O | O | O |
| Embodiment 5 | Δ | O | O | O | O |
| Embodiment 6 | O | O | O | O | O |
| Comparison Example 1 | X | X | X | Δ | Δ |
| Comparison Example 2 | O | O | O | O | O |
| Comparison Example 3 | X | X | Δ | O | O |
| Comparison Example 4 | X | X | Δ | O | O |
| Comparison Example 5 | X | X | Δ | O | O |
| Comparison Example 6 | X | X | Δ | O | O |
| Comparison Example 7 | Δ | Δ | O | O | O |
| Comparison Example 8 | X | X | X | Δ | Δ |
| Comparison Example 9 | X | X | O | O | O |
| Comparison Example 10 | X | X | Δ | O | O |

As can be seen in Table 3, the rollers in Comparison Examples 1, 3 and 4 in which the rollers were only secondarily crosslinked without being vacuum-heated and Comparison Examples 6, 8, 9 and 10 in which the rollers were subjected only to solvent extraction without being vacuum-heated caused the contamination of the photoreceptor irrespectively of the sum of the concentrations of the low polymerization degree siloxanes and non-functional silicone oils in the silicone raw rubber. Further, of Comparison Examples in which only solvent extraction was effected without vacuum heating, Comparison Example 7 using hexane as a solvent did not cause much contamination of the photoreceptor, but was found unsuitable for practical use since it took 76 hours for treatment. In contrast, the rollers in Embodiments 1–6 in which a molding material containing a silicone rubber type compound having the sum of the concentrations of low polymerization degree siloxanes and non-functional silicone oils adjusted to not more than 5000 ppm and in which the roller subsequent to the molding was vacuum-heated, did not cause the contamination of the photoreceptor irrespectively of the vacuum heating conditions and the presence or absence of secondary crosslinking effected at ordinary pressure.

Figure 5:
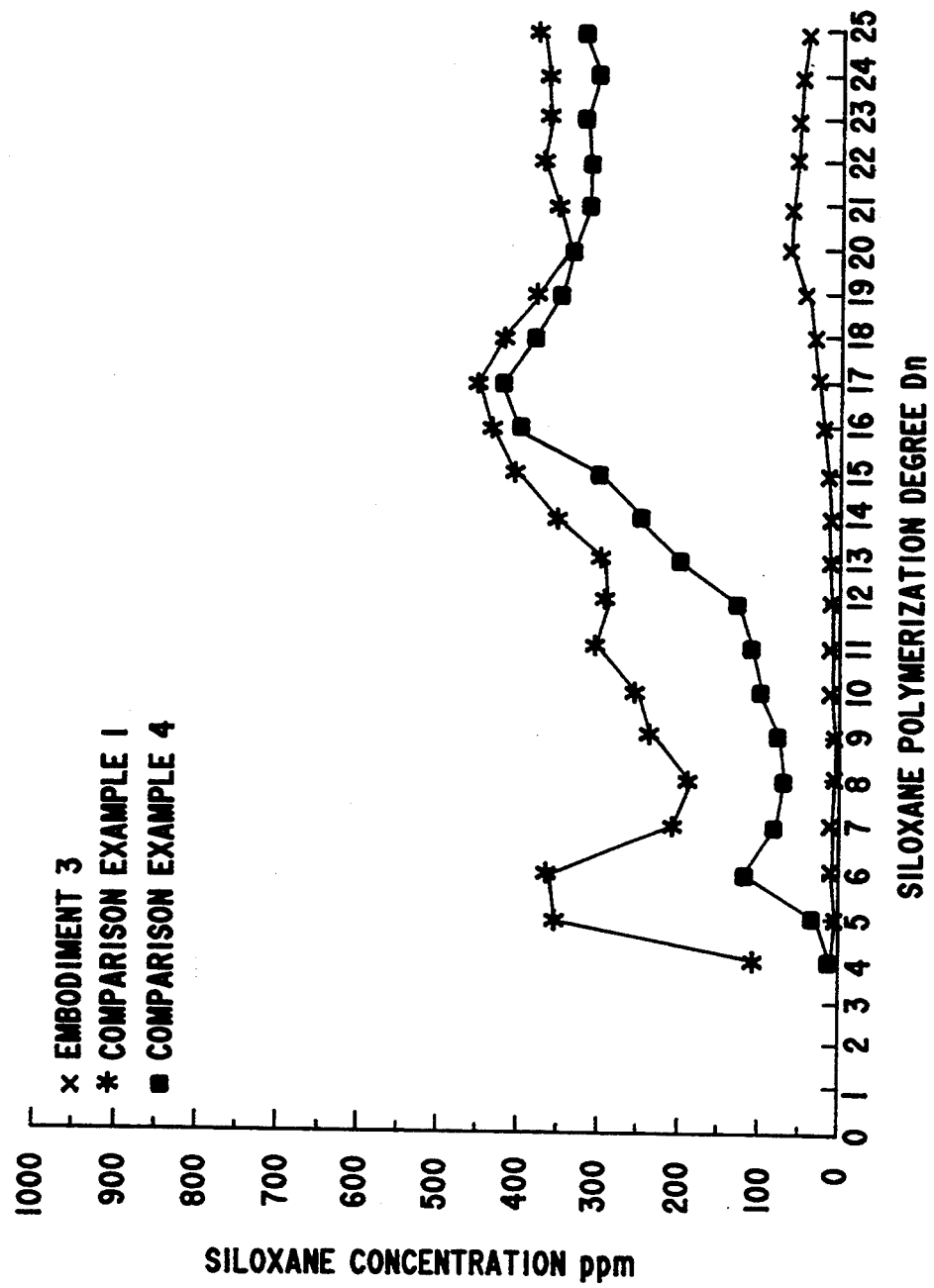
FIG. 5 is a graph showing the relation between the concentration of low polymerization degree siloxanes (having a polymerization degree of 4-25) and different methods of treating rollers as shown in the indicated examples, concerning rollers made according to the second embodiment of the invention, and, according to some comparison examples.

The concentration of the low polymerization degree siloxanes in the rollers in Embodiment 3 (vacuum heating), Comparison Example 1 (ordinary pressure heating) and Comparison Example 4 (solvent extraction) was measured, it being found that as shown in FIG. 5, the concentration of the low polymerization degree siloxanes in Embodiment 3 is much lower than that of the rollers in Comparison Examples 1 and 4.

From the above results, it is seen that the most effective way of preventing contamination of the photoreceptor is to vacuum-heat the roller after molding.

The roller in Comparison Example 2 in which a molding material containing a compound having the sum of the concentrations of low polymerization degree siloxanes and non-functional silicone oils not having been adjusted to not more than 5000 ppm was used and in which the roller subsequent to the molding was vacuum-treated, did not cause contamination of the photoreceptor as in Embodiments 1–6. The roller in Comparison Example 2 together with the rollers in Embodiments 2, 3 and 4 were left for 18 days and then the same tests were conducted, it being found that as shown in Table 4, although the rollers in Embodiments 2, 3 and 4 did not cause contamination of the photoreceptor but that the roller in Comparison Example 2 caused contamination of the photoreceptor.

TABLE 4

|  | Test chart | | | | |
| --- | --- | --- | --- | --- | --- |
|  | 1st | 2nd | 3rd | 4th | 5th |
| Embodiment 2 | Δ | Δ | ○ | ○ | ○ |
| Embodiment 3 | ○ | ○ | ○ | ○ | ○ |
| Embodiment 4 | ○ | ○ | ○ | ○ | ○ |
| Comparison Example 2 | X | Δ | Δ | ○ | ○ |

Figure 6:
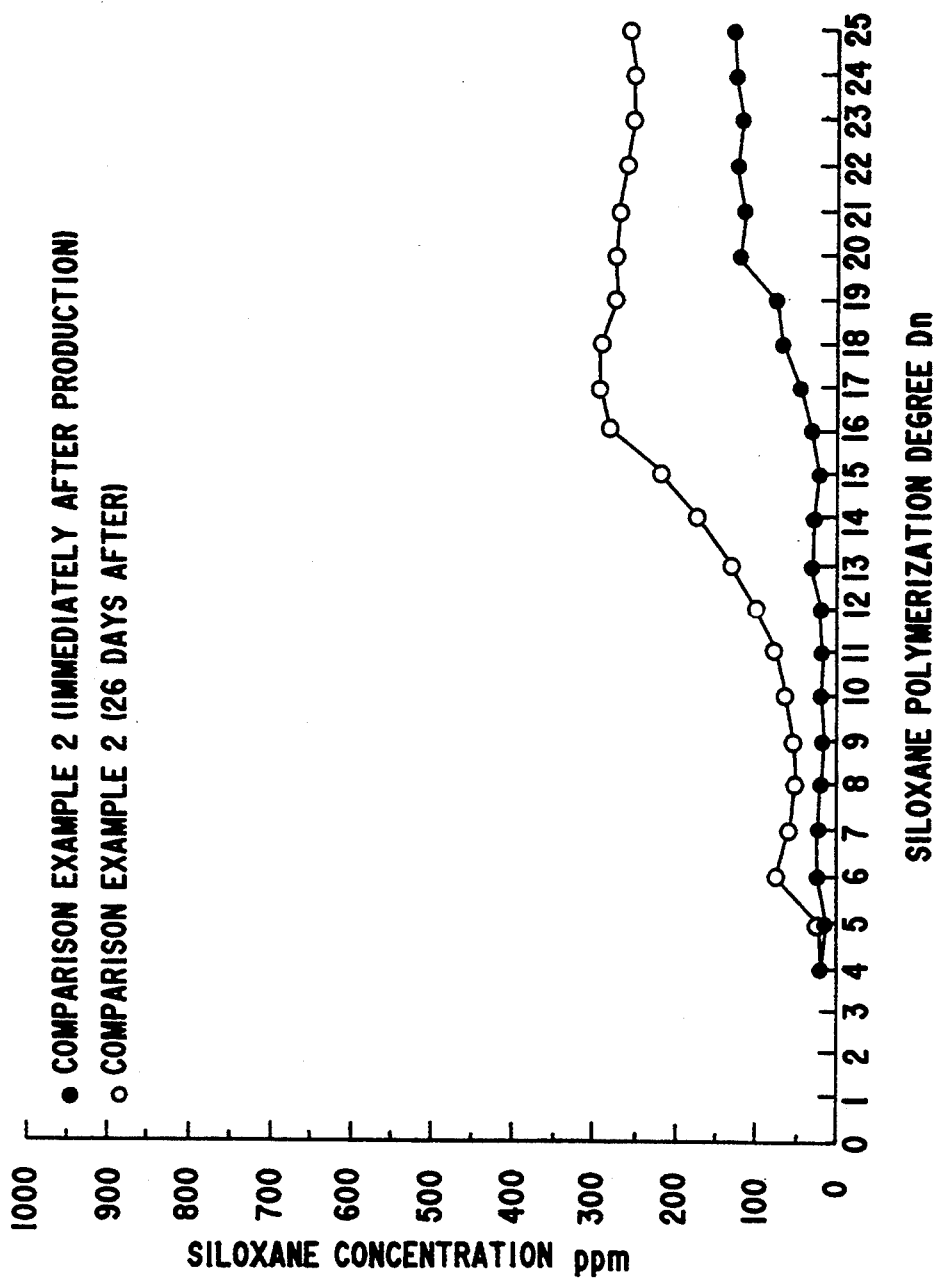
FIG. 6 is a graph showing time-dependent changes in the concentration of low polymerization degree siloxanes in Comparison Example 2.

Further, the concentration of low polymerization degree siloxanes having a polymerization degree of 4–25 on the roller surface in said Comparison Example 2 was measured by gas chromatography immediately after production of the roller and 26 days thereafter, and it was found that as shown in FIG. 6, the concentration of low polymerization degree siloxanes increased with the lapse of time.

From the above result, it has been ascertained that in the case where a molding material containing a silicone rubber type compound in which the sum of the concentrations of the two types of substances has not been adjusted to not more than 5000 ppm is used, the two types of substances cannot be completely removed by vacuum heating alone, and the low polymerization degree siloxanes and non-functional silicone oils remaining in the roller gradually bleed to the surface to contaminate the photoreceptor; thus, the removal effect is lost.

It has been ascertained that contamination of the photoreceptor can be prevented for a long time only if a molding material containing a silicone rubber type compound in which the sum of the concentrations of the two types of substances has been adjusted to not more than 5000 ppm is used and vacuum-heated.

As has been described so far, according to the present invention, a silicone rubber type compound of the grade in which the sum of the concentrations of the two types of substances has been adjusted to not more than 5000 ppm is used and after it is molded, it is vacuum-heated, thereby substantially completely removing the low polymerization degree siloxanes and non-functional silicone oils; therefore, it is possible to produce a silicone rubber roller for electrophotography having no danger of contaminating the photoreceptor not only immediately after the use of the roller but also for a long time thereafter. Thus, according to the present invention, it is possible to put into practical use an image forming apparatus of the contact charging type which does not cause contamination of air or deterioration of the photoreceptor due to generation of a large amount of ozone.

What is claimed is:

1. A rubber roller for use in electrophotography to produce an image, said rubber roller comprising a porous body which comprises:
    100 parts by weight of a rubber, consisting essentially of a crosslinked rubbery polysiloxane polymer;
    about 18 to 28 parts by weight of silica; and
    about 5 to 12 parts by weight of carbon black;
        wherein said amounts of said silica and said carbon black are sufficient for said body to have an Asker C hardness of up to about 35° and an electrical resistance of about $10^3$ to $10^8$ ohms; and
        wherein the quality of the image produced when using said roller is substantially without fault and is substantially the same regardless of whether the ambient atmospheric temperature and humidity during said electrophotography are high, ordinary or low.

2. A roller as claimed in claim 1 wherein said polysiloxane polymer is cross-linked when it is in admixture with said carbon black and said silica.

3. A roller as claimed in claim 1 wherein said silica is at least one member selected from the group consisting of hydrated silica, anhydrous silica, and silica salts.

4. A roller as claimed in claim 1 wherein said carbon black is at least one member selected from the group consisting of furnace black, acetylene black and ketjen black.

5. In the method of electrophotographing a subject, which comprises charging, exposing, developing, transferring an image, discharging and cleaning, by subjecting the subject to be photographed to an electrically charged roller;
    the improvement, whereby producing substantially the same quality of image regardless of the ambient atmospheric conditions of temperature and humidity, which comprises:
    subjecting said subject to be photographed to an electrically charged charging roller comprising a porous body which comprises:
    100 parts by weight of a cross linked polysiloxane polymer;
    about 18 to 28 parts by weight of silica; and
    about 5 to 12 parts by weight of carbon black,
        wherein said amounts of silica and carbon black are present in amounts sufficient for said body to have an Asker C hardness of up to about 35° an electrical resistance of about $10^3$ to $10^8$ ohms.

6. An improved method as claimed in claim 5 wherein said silica in said roller is at least one member selected from the group consisting of hydrated silica, anhydrous silica, and silica salts.

7. An improved method as claimed in claim 5 wherein said carbon black is at least one member selected from the group consisting of furnace black, acetylene black and ketjen black.

8. An improved method as claimed in claim 5 comprising subjecting said subject to be photographed to contact with said electrically charged roller which was made by cross-linking and then molding an admixture of said polysiloxane, said silica and said carbon black together with sufficient foaming agent to form a foam-form porous roller.

9. In an electrophotographic recording apparatus comprising:
   means for charging a photoreceptor surface;
   means for exposing said charged photoreceptor surface to an image being recorded;
   means for developing said image;
   means for transferring said developed image to a receiver therefore;
      the improvement which comprises said means for charging said photoreceptor surface comprising a porous rubber body, wherein said body comprises:
   100 parts by weight of rubber, consisting essentially of cross linked rubbery polysiloxane polymer;
   about 18 to 28 parts by weight of silica; and
   about 5 to 12 parts by weight of carbon black;
      wherein the amounts of said silica and carbon black are sufficient to cause said porous rubber body to have an Asker C hardness of up to about 35°, and an electrical resistivity of about $10^3$ to $10^8$ ohms.

* * * * *